United States Patent

Francois

[15] 3,638,455
[45] Feb. 1, 1972

[54] FILAMENT-WOUND RESIN TORSION TUBES WITH MOLDED END SPLINES

[72] Inventor: Edgar Francois, Wayne, N.J.
[73] Assignee: Uniroyal, Inc., New York, N.Y.
[22] Filed: July 8, 1970
[21] Appl. No.: 53,071

[52] U.S. Cl. .................................................64/23
[51] Int. Cl. .................................................F16d 3/06
[58] Field of Search ........................................64/1 S, 9, 23

[56] References Cited

UNITED STATES PATENTS 3,367,142  2/1968  Groves et al. ..............................64/23
3,400,558  9/1968  Haines ........................................64/23

*Primary Examiner*—Kenneth W. Sprague
*Attorney*—Norbert P. Holler

[57] ABSTRACT

A cylindrical, open-ended, filament-wound resin tube capable of use as a torsion bar or spring, a drive shaft, etc., and having in at least one end region thereof a set of integral molded splines designed to provide for a positive connection of the tube to a cooperatively splined adjunct of the structural members to be interconnected, is disclosed. The splines, which are formed without machining by applying radially directed pressure to the respective end region of the tube, before the final curing thereof, to shape the same against an appropriately contoured mold, are contoured in width along at least a part of their length in the direction away from the proximate open tube end, to provide for a gradual stress transfer to the splines over the entire effective lengths thereof. Added support for the splines may be provided by means of a backup sleeve of metal or filament-wound resin secured to the back surface of the splined end region of the tube.

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

23 Claims, 10 Drawing Figures

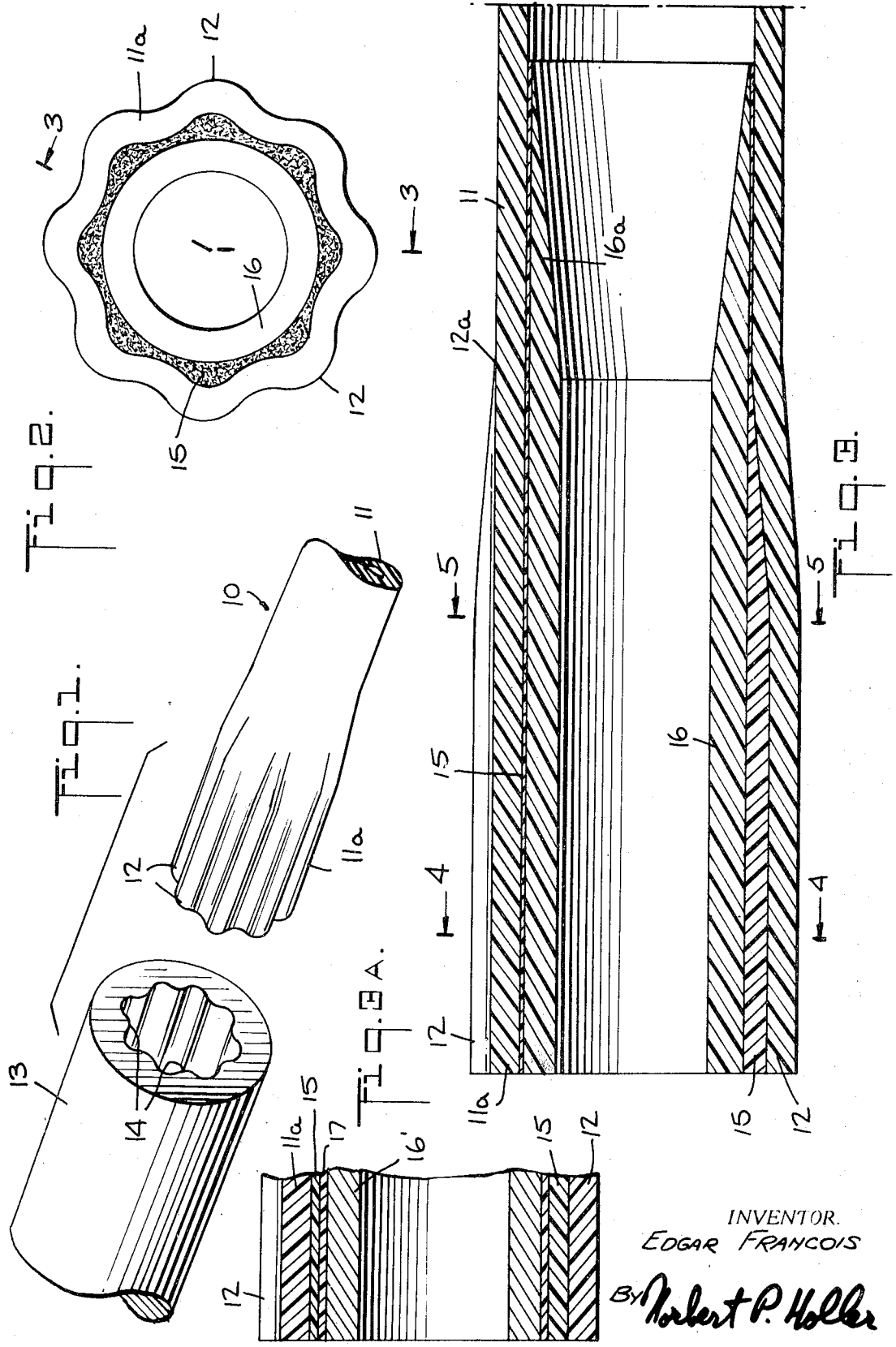

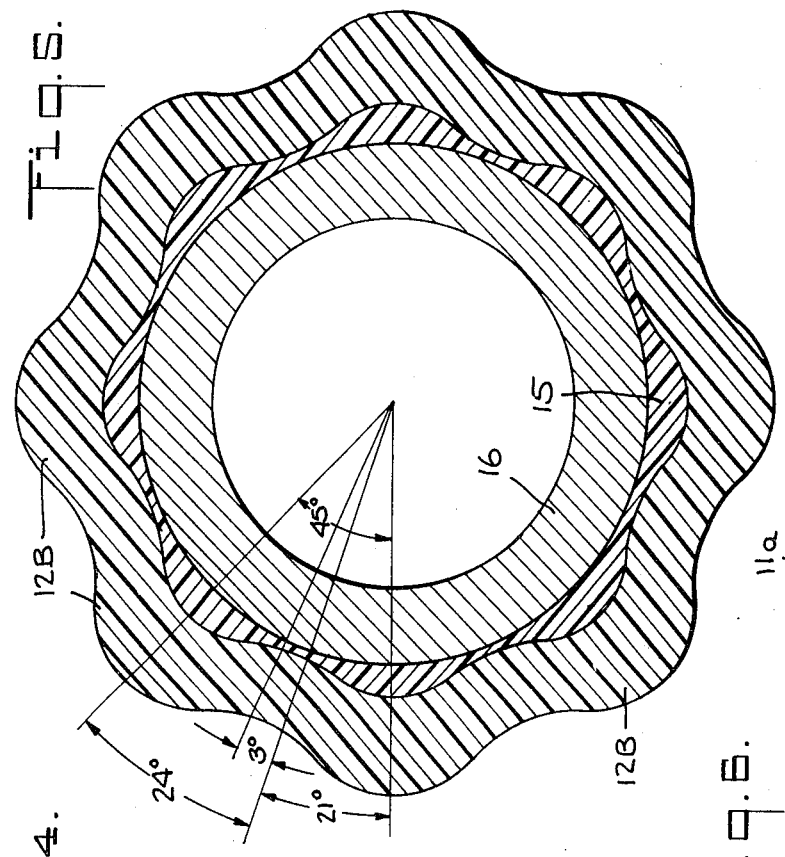
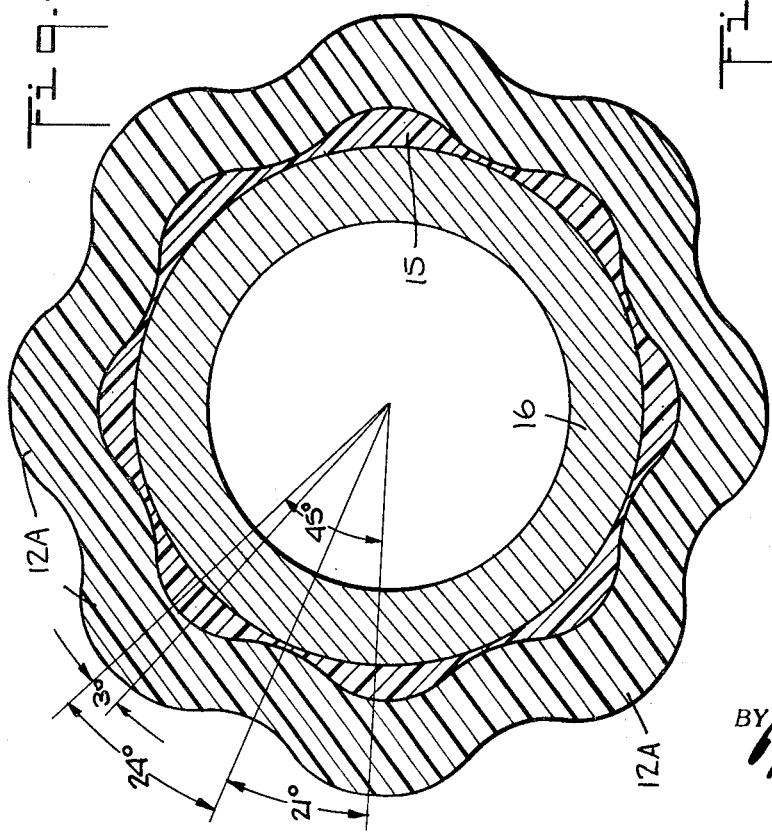
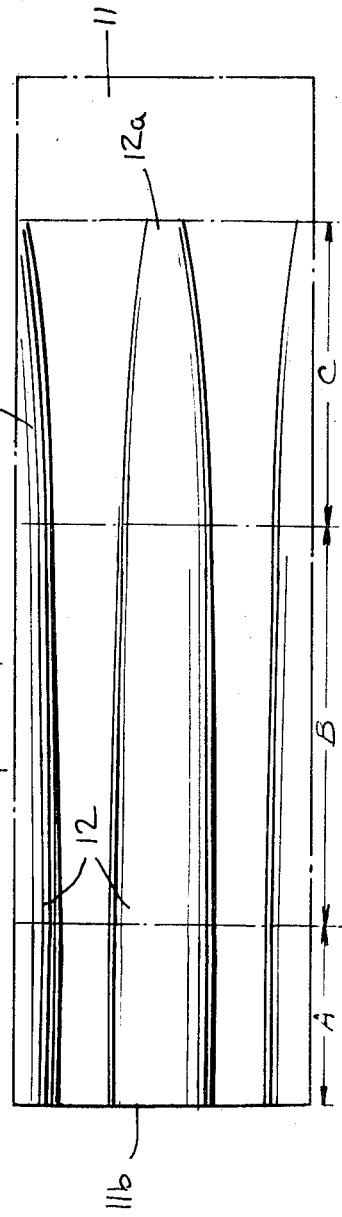

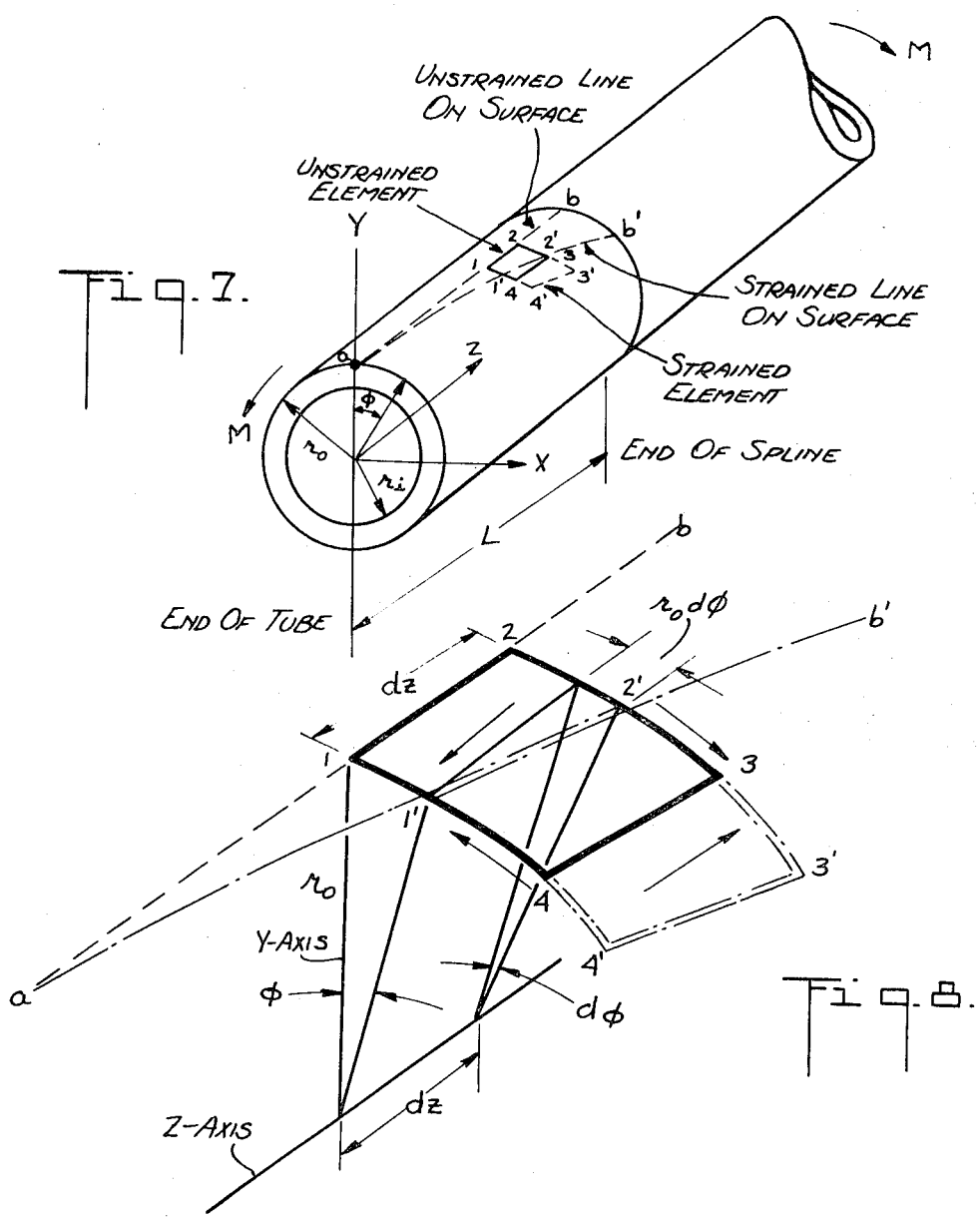
Fig. 7.
Fig. 8.
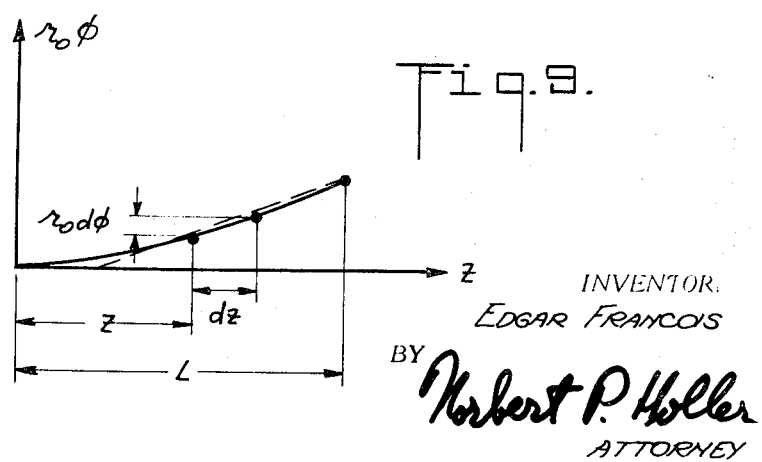
Fig. 9.
INVENTOR.
EDGAR FRANCOIS
BY Norbert P. Holler
ATTORNEY

FILAMENT-WOUND RESIN TORSION TUBES WITH MOLDED END SPLINES

This invention relates to torque-sustaining devices, and in particular to filament-wound resin tube structures which are designed for use, inter alia, as torsion bars or springs in a variety of applications where the use of torsion bars is required, such as in the suspensions of land vehicles, including tanks, trucks and automobiles, aircraft, various types of machinery, and the like.

Although the use of metallic bars, rods and tubes as torque-sustaining members, e.g., as torsion bars, drive shafts, etc., is well known, the use of such members made of filament-wound resin may be highly desirable in any number of applications, for example where increased rotation of such members is needed or the reduction of weight of the member without adverse effect on its strength is an important consideration. Especially in the case of reinforced resin tubes, however, problems have been encountered in effecting a positive connection or coupling of such a tube to adjuncts of the structures being interconnected, e.g., a vehicle axle and body, in preventing failure of the tube in the coupling end region or regions thereof under the applied stresses, in ensuring a uniform distribution of the applied stresses over the entire axial length of the coupling end regions of the tube, and in avoiding the need for making the diameter of the tube end regions considerably greater than the diameter of the cylindrical main body of the tube merely in order to achieve the requisite strength characteristics.

It is an object of the present invention, therefore, to provide a filament-wound resin torsion tube with a novel coupling end region construction which enables the aforesaid problems to be effectively overcome.

It is also an object of the present invention to provide a cylindrical filament-wound resin torsion tube with at least one splined coupling end region so designed as to afford improved efficiency in the coupling end region and to enable a reduction of the ratio of end diameter to main body diameter without loss of strength.

Generally speaking, the present invention in its preferred aspects provides an open-ended, filament-wound resin tube usable as a torsion bar or spring, as an axle or shaft for transmitting torque, etc. The tube is preferably a glass fiber and epoxy resin structure, characterized by the provision, in at least one and usually both of the end regions thereof, of an integrally molded set of axial coupling splines designed to meet strength requirements imposed by local stress distributions with a minimum increase in tube cross section. A gradual and approximately uniform distribution of stress transfer over the entire length of each splined portion of the tube is ensured by the splines being tapered in width along a substantial part of their length in the direction away from the proximate open end of the tube. A reinforcing cylinder or sleeve may be secured to the back surface of each end region of the tube to provide added support for the splines.

The foregoing and other objects, characteristics and advantages of the present invention will be more clearly understood from the following detailed description thereof when read in conjunction with the accompanying drawings, in which:

FIG. 1 is a fragmentary perspective view of a splined-end filament-wound resin torsion tube according to one aspect of the present invention and illustrates the manner of coupling thereof to a cooperatively splined structural member;

FIG. 2 is an end elevational view of the torsion tube shown in FIG. 1;

FIGS. 3 and 3A are fragmentary sectional views, on different scales, taken along the line 3—3 in FIG. 2, FIG. 3A illustrating a slightly modified embodiment of the tube end region construction;

FIGS. 4 and 5 are sectional views taken along the lines 4—4 and 5—5, respectively, in FIG. 3;

FIGS. 6 is a fragmentary plan view, on a somewhat enlarged scale, of the splined end region of the torsion tube shown in FIG. 1; and FIGS. 7, 8, and 9 graphically illustrate the derivation of the spline configuration.

Referring now to the drawings in greater detail, the filament-wound resin torsion tube 10 according to one embodiment of the basic principles of the present invention comprises a cylindrical, open-ended body 11 (FIGS. 1 and 2) which at at least one and usually both end regions 11a thereof (only one is shown) is provided with a series of axially extending external splines 12 of a special configuration to be more fully explained presently. The splines may, of course, be internal of the tube just as well. For the sake of simplicity, however, except where otherwise indicated, the following description of the invention will be couched primarily in terms of an external or male spline system. The filament-wound resin structure (the reinforcement has been omitted from the drawings for the sake of clarity) is generally conventional, with the continuous filaments in successive plies oriented at equal but opposite angles of about 40° to 50°, preferably about 45°, with respect to the axis of the tube.

The splines 12 are provided to enable the tube to be positively coupled to a cooperatively splined female structural member 13, e.g., a tubular socket constituting an adjunct of a vehicle axle or body (or of the output of a power source if the tube is to be used in power transmission) or the like, and having a respective internal set of splines 14. The splines 12 are formed without machining, by radially expanding the respective end region 11a of the tube, while the same is still not fully cured, i.e., while it is no more than in a partially precured condition, into an appropriately internally contoured external mold under the action of outwardly directed radial pressure applied to the interior of the tube end region (e.g., by a type of blow molding technique). The cure of the tube is then completed while the said end region thereof is held in the mold. During the expansion, of course, the orientations of the filaments in the tube end region may change somewhat, with the bias angle increasing by not more than a few degrees depending on the precise magnitude of the expansion, but this will not be sufficient to have any materially adverse effect on the ultimate torque rating of the tube.

It will be apparent from the foregoing that the filaments remain unbroken and straight, i.e., free of kinks and unbuckled, while the splines are being molded. By way of contrast, were the splines to be machined to their intended size and configuration, avoiding the presence of broken filaments would be impossible. Inasmuch as the molded splines according to the present invention are, therefore, reinforced by continuous high modulus glass filaments or the like, they are possessed of substantially higher strength characteristics than machined splines would be and are more resistant to shear stresses, since a spline cannot be broken off without breaking the filaments.

In order to provide added support for the molded splines 12 and prevent internal distortion thereof under load, a backup cylinder or sleeve 16 may be secured to the back, i.e., the interior, surface of the tube end region 11a (FIGS. 2, 3, 4 and 5), for example by being potted into the tube by means of a filler resin 15, preferably epoxy. The backup sleeve 16 according to this aspect of the present invention is a cylindrical filament-wound glass fiber and epoxy resin structure having an approximately ±40°–50° filament angle, and preferably has a tapered thickness section 16a at the inwardmost portion of its length underlying the region of the torsion tube body 11 contiguous with the innermost ends 12a of the splines 12.

In accordance with an alternative aspect of the present invention, a metal backup sleeve 16' (FIG. 3A) also extending somewhat beyond the spline ends 12a may be used in lieu of the filament-wound resin sleeve 16, but in that event it is advisable additionally to cement a thin layer 17 of elastomeric material, e.g., a suitable polyurethane or cis-polybutadiene composition, to the outer surface of the sleeve 16' before the latter is potted into the tube with the aid of the filler resin 15. The elastomer layer 17 ensures a distribution of the stress transfer over the entire length of the sleeve. A thickness of 0.005–0.010 inch for the elastomer layer 17 is deemed to be satisfactory for a 1 inch diameter filament-wound glass fiber and epoxy resin tube, but for larger tubes the layer thickness would have to be increased in proportion to the increase in diameter.

If desired for extra strength, furthermore, one or more additional layers of glass filaments may be incorporated in the splined end region of the tube, which under certain conditions might even enable the provision of a backup sleeve to be dispensed with. Such additional layer or layers could be formed as a part of the continuous filament layup or winding operation, with the portion of the extra runs of the filament winding lying in the straight cylinder section of the tube being cut out. The extra layer or layers could constitute as much as 50 percent of the total thickness of the tube in the spline region, but normally extra windings making up from about 10 to 30 percent of the total thickness will be found effective.

The details of the molded spline arrangement which embodies the presently contemplated best mode of achieving uniformity of stress transfer from the socket member 13 to the torsion tube 10, are illustrated in FIGS. 4, 5 and 6. In general, it will be seen that the outer surface of each splined coupling end region 11a of the tube 10 is characterized by the presence of three distinct configurational zones A, B, and C (FIG. 6) extending from the open end 11b of the tube to the imaginary line marking the common transverse plane of the innermost ends 12a of the splines 12. Of these zones, the two outermost zones A and B are the functionally most significant ones, since the portions of the splines 12 located in these zones will be engaged by the splines 14 of the socket member 13 during the application of torque to the tube 10. The zone C, as shown, constitutes the region in which the tube splines 12 disappear and merge into the outer tube surface with controlled low stress concentration, but in which they are basically not engaged by the socket splines 14.

In each of the zones A and B, the spline configuration circumferentially of the tube is of somewhat modified sinusoidal form, but not identically so. Thus, in the zone A, each spline, designated 12A in FIG. 4, is somewhat flattened at its apex (typically for an arc length of about 3° in an eight-spline system) and has two separate and equal radii of curvature for its respective flanks, while each of the various grooves between the adjacent pairs of splines has a single radius of curvature equal to those of the spline flanks. The spline height and width remain constant in the zone A. Accordingly, the external form of the tube in the zone A is constant over the entire axial length thereof. It will be understood that the view of FIG. 4 is taken in zone A substantially at the juncture thereof with the zone B.

In the zone B, on the other hand, the various splines, designated 12B in FIG. 5, while remaining at the same constant height, taper in width over the entire length of the zone until, at the juncture between the zones B and C, the apex of each spline is rounded to a single radius of curvature while each groove between the adjacent pairs of splines is somewhat flattened at its base (again typically for an arc length of about 3° in an eight-spline system) and has two separate and equal radii of curvature at its flanks equal to that of the spline apex. The view of FIG. 5 is taken substantially at the juncture between the zones B and C, and it will be understood, therefore, that the spline configuration in the zone B varies gradually from the form thereof shown in FIG. 4 to the form shown in FIG. 5, with each spline tapering in width over the portion of its length intermediate the zones A and C.

In the zone C, of course, the splines taper in height as well as in width, as they merge and disappear into the body of the tube. Except for the requirement, however, that the length of this section of the coupling end region 11a must be consistent with good design principles to avoid the occurrence of undue stress discontinuities or concentrations in the tube, the rate or degree of tapering of the splines in zone C is not critical.

It will be understood that the total axial length of the zones A, B and C, as well as the axial lengths of the individual zones relative to each other or to their total axial length or to the overall length of the tube, need not be uniquely defined herein, since these parameters, albeit variable, will be readily determinable in accordance with standard physical principles in the light of the conditions of use of the tube to be encountered. The basic requirement to be observed, however, is that the combined zones A and B must be long enough to distribute the stresses sustained thereby so as not to exceed the laminar shear strength of the resin/fiber composite at any given point.

A method for deriving an efficacious torsion tube molded spline configuration which embodies the principles of the present invention and enables the desired uniformity of stress transfer to be achieved, is illustrated in FIGS. 7, 8, and 9. For the purposes of this analysis, the axis of the torsion tube is taken to be the Z-axis of an orthogonal system of coordinates, and the tube is shown as having a cylindrical body portion of outer radius $r_o$ and inner radius $r_i$ and a coupling end region (the splines are not sown in FIG. 7 for the sake of simplicity) of effective length L measured from the end of the tube to what would be in FIG. 6 the plane of juncture of the zones B and C (designated by the legend "End of Spline" in FIG. 7). The outer radius of the tube end region is also taken to be equal to $r_o$.

In the end region of the tube, a straight line $a$—$b$ extending in the Z-direction on the surface will deform under an applied moment of torque M into a curved line $a$—$b'$ (FIGS. 7 and 8), and concomitantly a quadrangular surface element 1–2–3–4 in which one of the axial side edges thereof is defined by said line, will deform to the shape 1'–2'–3'–4', 0 being the angle of twist of any point on the axially outwardmost edge 1–4 of the surface element measured from the Y-axis z being the distance of that edge of the surface element from the tube end, $dz$ being the dimension of the surface element in the axial direction, and $d\,0$ being the differential in the angle of twist between the axially outwardmost and inwardmost edges of the surface element. A plot of curvature of the line against the axial distance from the tube end is represented by the solid-line curve in FIG. 9.

As previously stated, the spline contour should be so designed as to ensure that stress will be transferred into the tube as uniformly as possible along the effective length of the splines. For this condition to exist, the shearing strain $\gamma_e$ in the end region should be portional to the distance z from the tube end. Since the shearing strain $\gamma_b$ in the cylindrical main body portion of the tube remains constant over its entire length, there being no change in torque in this portion, the end region shearing strain (in inches per inch) is expressed by the relation $$\gamma_e = (z/L)\gamma_b, \tag{1}$$

with $\gamma_e$ having a maximum limiting value of $\gamma_b$ for all values of z equal to or greater than L. The main body portion shearing strain is expressed by the relation $$\gamma_b = r_o 0_{max}, \tag{2}$$

wherein $0_{max}$ is the unit rotation of the main body portion, i.e., the change in 0 over a 1 inch length of the main body portion. $0_{max}$ is readily determinable constant based on the applied torque M, the inner and outer radii $r_i$ and $r_o$, and the torsional modulus E, in the main body portion of the tube. Substituting equation (2) into equation (1), $$\gamma_e = (z/L)(r_o 0_{max}). \tag{3}$$

The end region shearing strain, as will be seen from FIGS. 8 and 9, is also expressed by the relation $$\gamma_e = r_o(d0/dz). \tag{4}$$

Substituting equation (4) into equation (3); transpositioning and integrating, $$r_0 (d\phi/dz) = (r_0 \phi_{max})(z/L), \tag{5}$$

$$r_0 \int d\phi = (r_0 \phi_{max}/L) \int z\,dz, \tag{6}$$

and $$r_0 \phi = (r_0 \phi_{max}/2L)z^2 + K, \tag{7}$$

where K is a constant. The boundary condition $r_o\,0=0$ at $z=0$ (the tube end) yields $K=0$, and equation (7) thus becomes
$$r_o0=(r_o0_{max}/2L)z^2. \quad (8)$$
The effective length of the coupling end region is determined by the requirement that the maximum shear stress $\sigma$ must be so distributed as not to be in excess of the laminar shear strength of the filament/resin composite of which tube is made. The maximum shear stress is defined by the relation
$$\sigma=M/[2\pi(r_o)^2LC], \quad (9)$$
where $C$ is the effective fraction of the circumference of the tube end region at the bases of the splines.

Equation (8), it will be understood, thus defines the spline configuration, i.e., the lateral outer surface curvature, which each spline theoretically should have starting from the tube end in order to enable the stress transfer to be uniform along the effective length of spline. In actual practice, however, it may be unnecessary to go to the trouble of preparing a mold with internal contours conforming precisely to this equation. It has been found instead, that the theoretical second degree curvature spline contour can be approximated by a straight line taper (FIG. 6) starting from a point spaced from the tube end in the direction of the main body portion of the tube, i.e., at the axially inwardmost end of the zone A. The approximation is illustrated by the broken-line curve in FIG. 9 and amounts to a maximum deviation of only about 0.002 inch from the theoretical contour.

When the tube 10 is to used, for example as one of the torsion bars or springs of a vehicle, the coupling end regions 11a thereof are inserted into the respective metal sockets 13 which are adjuncts of and suitably secured to the axle and body of the vehicle. At this time, it should be noted, only the end portions of the tube splines in the zones A are in full engagement with the corresponding portions of the socket splines, since in each socket 13 the splines 14 are conventionally machined straight over their entire length so as to have a constant modified sinusoidal configuration substantially identical to that of the end portions of the tube splines in the respective zones A of the tube end regions. Each socket may, of course, extend as far over the associated tube end region as desired, for example, up to or even beyond the juncture of the respective zone C with the main body portion of the tube, but in practice the extent of telescoping need not exceed the length of the contiguous zones A and B, since only the portions of the tube splines 12 in these zones will be engaged by and in torque transfer relationship with the socket splines 14. Thereafter, during any application of an increasing torque, whether by the initial static loading of the torsion bars as they are subjected to the full weight of the stationary vehicle body, or by any subsequent dynamic loading as the vehicle is driven, there is a corresponding progressively increasing contact in the zones B between the two sets of socket splines and the respective sets of tube splines as the latter are deformed (irrespective of whether the taper follows the theoretical configuration or the approximation), resulting in a progressive distribution of the stress transfer over the effective lengths of the tube splines. Upon any decrease of applied torque, of course, the torsion bars tend to "unwind" accordingly, leading to a progressively decreasing contact between the various spline portions in the zones B. From this last consideration it will be understood that it would be sufficient to provide the necessary taper on only one side of each of the tube splines, which would in effect create a "single-acting" tube requiring a specified orientation on installation, but a dual taper, such as illustrated, is preferred since it renders the tubes "double-acting" and thus more versatile from the standpoint of installation.

By way of serving as an example of the implementation of the principles of the present invention, the filament-wound resin tube 10 illustrated in FIGS. 1 to 6 represents an actual model torsion tube construction characterized by an overall tube length of 14.0 inches, outer and inner radii of 0.475 inch and 0.375 inch, respectively, in the main body portion 11, and a splined end region 11a as hereinafter more fully described. The load specifications, arbitrarily selected as the goals to be attained, were a maximum applied torque capability of about 6,680 in.lbs. and a maximum rotation of 3.8°/in. The material specifications for both the tube 10 and the cylinder 16 were commercially available 20-end E-glass fiber roving having a tensile strength of at least 5.0 lbs.end, and a suitable liquid epoxy resin system including commercially available resin and curative or hardener components, with the composite specified to have an interlaminar shear of at least 6,000 p.s.i. in the cured state. The specifications for the potting or filler material 15 were an epoxy resin system likewise including commercially available resin and curative or hardener components in the ratio of 100 parts by weight resin to 50 parts curative.

Each tube of this type was formed by conventional filament winding techniques utilizing opposite but equal winding angles of about 45° to the tube axis in adjacent plies, and the indicated eight splines were molded at one end of each tube, by telescoping the respective tube end region into an appropriately internally contoured annular mold, expanding the tube thereagainst by applying internal fluid pressure sufficient for proper flow, and permitting the cure to proceed to completion under standard time and temperature conditions with the tube end region held in contact with the mold. The total axial spline length in the end coupling region was 2.281 (2 9/32) inches. A filament-wound resin sleeve 16, having outer and inner diameters of 0.710 inch and 0.50 inch, respectively, an overall length of 3.375 (3⅜) inches, and a 1-inch long tapered section 16a with a wall thickness decreasing from 0.210 inch to 0.010 inch, was then potted into the interior of the coupling end region of each tube with the aid of the filler resin 15.

In the coupling end region 11a of each tube, the lengths of the individual zones A, B and C were, respectively, 0.5 inch, 1.031 (1 1/32) inches and 0.750 inch. The outer diameter was constant in the zones A and B, being 1.075 inch measured at the spline apices and 0.950 inch measured at the groove bases, and the effective fraction of the circumference at the spline bases was 93.5 percent. In the zone A, the arc lengths of the flattened regions of the spline apices (FIG. 4) were about 3°, and the twin radii of curvature of the splines as well as the single radius of curvature of the grooves were 0.145 inch. In the zone B, the splines tapered gradually and linearly in width along their length, with the grooves at their bases gradually flattening out to arc lengths of about 3° at the end of the zone (FIG. 5) while the splines were changing from twin to single radii of curvature of 0.145 inch. In the zone C, the splines tapered gradually in both height and width, ultimately merging and disappearing into the main body portion of the tube.

The tubes so produced were characterized by a maximum shear stress of about 3,300 p.s.i., well within the specified limit and providing a safety factor of nearly 2:1. In static tests, a tube of this type withstood applied torque of about 6,000 in.lbs. or about 90 percent of the desired specified maximum, failure occurring in the molded spline end region. In dynamic fatigue tests, a tube of like construction was cycled at the rate of 20 cycles per minute and at 40 percent of the specified torque maximum (2,400 in.lbs.) for 50,400 cycles without failure. Torque was then increased to 50 percent of the specified maximum (3,000 in.lbs.) and the test continued. Failure occurred in the molded spline region after 18,000 cycles. In addition, the molded spline construction of the present invention was characterized by a maximum end region diameter to main body diameter ratio of 1.13, which is substantially below any value of this ratio attainable by other types of end region constructions. It is this factor which makes the molded spline construction of great importance for torsion bars in such applications as military tanks where space is at a premium.

As previously indicated, it is within the contemplation of the present invention that the coupling end region splines may be molded to be disposed interiorly of the tube (not shown), for example by applying radially inwardly directed fluid pressure over the entire circumference of the exterior of the tube end region with the same disposed in surrounding relation to an appropriately contoured internal or mandrellike mold member. An internally splined tube of this type would, of course, require cooperating male or externally splined anchoring or drive members in lieu of the sockets 13. Also, should it be desired to reinforce the splines by means of a backup sleeve 16 or 16', the same would have to be disposed in circumferentially surrounding relation to the tube end region. In all other respects, however, the physical, structural and operational characteristics of the tube would be identical to those of an externally splined tube.

It will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

Having thus described the invention, what is claimed and desired to be protected by Letters Patent is:

1. A torque-sustaining device, comprising an open-ended continuous filament-wound resin tube which is cylindrical in shape over the major portion of its body, said tube at at least one end region thereof being provided with a plurality of cross sectionally substantially sinusoidal, circumferentially spaced, axially extending splines which are constituted by appropriately molded portions of the filament-wound resin structure and have the filament continuity maintained over their entire expanse, said splines being of constant height for a predetermined axial distance in from the proximate tube end and tapering in width gradually over at least the axially inwardmost part of that distance while the widths of the intermediate valleys increase correspondingly, and said splines thereafter tapering gradually in width and height until they disappear and merge smoothly into the cylindrical contours of the tube body.

2. A torque-sustaining device according to claim 1, wherein said splines taper in width over said entire axial distance.

3. A torque-sustaining device according to claim 2, wherein the taper of each said splines is curvilinear in accordance with the relation $r_o 0 = (r_o 0_{max}/2L) z^2$, $r_o$ being the outer diameter of said tube, 0 being the angle of twist of any point on the outer surface of said tube, $0_{max}$ being the unit rotation of the cylindrical body portion of said tube, $L$ being said predetermined axial distance, and $z$ being the distance of any point in said end region from the proximate end of said tube.

4. A torque-sustaining device according to claim 1, wherein all of said splines taper in width codirectionally from one side only.

5. A torque-sustaining device according to claim 1, wherein all of said splines taper in width from both sides.

6. A torque-sustaining device according to claim 1, wherein each of said splines is of constant width for a first part of said predetermined axial distance starting at the proximate end of said tube, and then tapers gradually and rectilinearly for the remainder of said distance.

7. A torque-sustaining device according to claim 6, wherein all of said splines taper in width codirectionally from one side only.

8. A torque-sustaining device according to claim 6, wherein all of said splines taper in width from both sides.

9. A torque-sustaining device according to claim 6, wherein each of said splines in the constant height/constant width section thereof is somewhat flattened at its apex and is characterized by separate but equal radii of curvature for its flanks while each of the adjacent valleys is characterized by a single radius of curvature, and wherein each of said splines at the axially inwardmost end of the constant height/tapering width section thereof has so changed as to be characterized by a single radius of curvature at its apex while each of the adjacent valleys is somewhat flattened at its bottom and is characterized by separate but equal radii of curvature for its flanks.

10. A torque-sustaining device according to claim 1, wherein said splines project exteriorly from said tube.

11. A torque-sustaining device according to claim 1, wherein said splines project interiorly from said tube.

12. A torque-sustaining device according to claim 1, further comprising a cylindrical backup sleeve secured by a resin bond circumferentially to the back surface of the splined end region of said tube, said sleeve extending from the proximate open end of said tube for a distance somewhat greater than said predetermined axial distance.

13. A torque-sustaining device according to claim 12, wherein said backup sleeve is a filament-wound resin structure.

14. A torque-sustaining device according to claim 12, wherein said backup sleeve is a metallic structure, and a thin layer of elastomeric material is cemented to that surface of said sleeve which faces said back surface of said end region of said tube.

15. A torque-sustaining device according to claim 12, wherein said splines project exteriorly from said tube, and said backup sleeve is secured to the interior surface of said end region of said tube.

16. A torque-sustaining device according to claim 12, wherein said splines project interiorly from said tube, and said backup sleeve is secured to the exterior surface of said end region of said tube.

17. A torque-sustaining device according to claim 1, wherein the filament component of said tube is glass fiber, and the resin component is epoxy.

18. A torque-sustaining device according to claim 1, wherein said tube is provided at both end regions thereof with identical sets of said splines.

19. A torque-sustaining device according to claim 1, wherein said end region of said tube is further reinforced by at least one layer of filament windings in excess of the number constituting said body portion of said tube.

20. A torque-sustaining device, comprising an open-ended continuous filament-wound resin tube which is cylindrical in shape over the major portion of its body, said tube at both of the opposite end regions thereof being provided with respective sets of external, cross-sectionally substantially sinusoidal, circumferentially spaced, axially extending splines which are constituted by appropriately molded portions of the filament-wound resin structure and have the filament continuity maintained over their entire expanse, said splines of each set being of constant height and width for a predetermined axial distance in from the proximate tube end and tapering in width gradually over at least the axially inwardmost part of that distance while the widths of the respective intermediate valleys increase correspondingly, and said splines of each set thereafter tapering gradually in width and height until they disappear and merge smoothly into the cylindrical contours of the tube body.

21. A torque-sustaining device, comprising an open-ended continuous filament-wound resin tube which is cylindrical in shape over the major portion of its body, said tube at each of the opposite end regions thereof being provided with respective sets of external, cross-sectionally substantially sinusoidal, circumferentially spaced, axially extending splines which are constituted by approximately molded portions of the filament-wound resin structure and have the filament continuity maintained over their entire expanse, said splines of each set being of constant height and width for a predetermined axial distance in from the proximate tube end, said splines of each set thereafter for a further predetermined axial distance from said proximate tube end remaining of the same height but tapering in width gradually and rectilinearly while the widths of the respective intermediate valleys increase correspondingly, and said splines of each set thereafter tapering gradually in width and height until they disappear and merge smoothly into the cylindrical contours of the tube body.

22. A torque-sustaining device according to claim 1, wherein each of said splines in the constant height/constant width section thereof is somewhat flattened at its apex and is characterized by separate but equal radii of curvature for its flanks while each of the adjacent valleys is characterized by a single radius of curvature, and wherein each of said splines at the axially inwardmost end of the constant height/tapering width section thereof has so changed as to be characterized by a single radius of curvature at its apex while each of the adjacent valleys is somewhat flattened at its bottom and is characterized by separate but equal radii of curvature for its flanks.

23. A torque-sustaining device according to claim 22, further comprising a cylindrical backup sleeve of filament-wound resin secured by a resin bond circumferentially to the interior surface of each splined end region of said tube, each sleeve extending from the respective proximate open end of said tube for distance somewhat greater than the axial length of the respective set of splines.

* * * * *

PO-1050
(5/69)

UNITED STATES PATENT OFFICE
CERTIFICATE OF CORRECTION

Patent No. 3,638,455     Dated February 1, 1972

Inventor(s) Edgar Francois

It is certified that error appears in the above-identified patent and that said Letters Patent are hereby corrected as shown below:

Column 3, line 69, after "however," read --that--; column 4, line 18, for "sown" read --shown--; column 4, lines 30 and 56, and column 7, line 41, for "O" read --$\emptyset$--; column 4, line 32, a comma should be found after "axis"; column 4, line 35, for "d O" read --d$\emptyset$--; column 4, line 44, for "portional" read --proportional--; column 4, lines 54, 55, 57 and 61, column 5, line 2, and column 7, lines 40 and 42, for "$O_{max}$" read --$\emptyset_{max}$--; column 4, line 57, after "is" read --a--; column 4, line 64, for "dO" read --d$\emptyset$--; column 4, line 75, column 5, line 2, and column 7, line 40, for "$r_o O$" read --$r_o \emptyset$--; column 8, line 60, for "approximately" read --appropriately--; column 8, line 72, for "1" read --21--; and column 10, line 5, after "for" read --a--.

Signed and sealed this 24th day of April 1973.

(SEAL)
Attest:

EDWARD M. FLETCHER, JR.      ROBERT GOTTSCHALK
Attesting Officer      Commissioner of Patents